United States Patent [19]
Dörner

[11] 3,923,256
[45] Dec. 2, 1975

[54] APPARATUS FOR TREATING OLD TIRES

[75] Inventor: Harald P. Dörner, Salach, Germany

[73] Assignee: Allgaier-Werke GmbH, Uhingen, Germany

[22] Filed: Jan. 9, 1974

[21] Appl. No.: 431,914

[30] Foreign Application Priority Data

Jan. 17, 1973 Germany.................... 2302120

[52] U.S. Cl. .................................. 241/76; 241/24
[51] Int. Cl.² ........................................ B02C 23/14
[58] Field of Search ............ 241/24, 29, 76, 77, 78, 241/79, 79.1

[56] References Cited
UNITED STATES PATENTS

| | | | |
|---|---|---|---|
| 2,462,645 | 2/1949 | Knowland | 241/24 |
| 2,471,043 | 5/1949 | Schenck | 241/24 X |
| 3,074,653 | 1/1963 | Schorsch | 241/24 X |
| 3,384,309 | 5/1968 | Marshall | 241/24 X |
| 3,749,322 | 7/1973 | Reynolds | 241/24 |

*Primary Examiner*—Granville Y. Custer, Jr.
*Attorney, Agent, or Firm*—Ernest G. Montague; Karl F. Ross; Herbert Dubno

[57] ABSTRACT

An apparatus for working up old tires by multi-stage comminution and sorting of the comminuted pieces on the basis of type and size comprising charging means for feeding whole old tires to a precomminuting unit and breaking down the tires into pieces of the size of approximately the palm of the hand, a conveyor means for feeding the pieces to a magnetic separator for removal of all steel-containing pieces, and a device for grinding the iron-free pieces. The latter device includes two grinding stages and is designed to separate the rubber from fiber components. The device receives the ground product and separates the rubber includes a separating means comprising a positively controlled vibrating screening device operating mechanically with relatively low frequency and having two or three screens a vibrating sorting device is arranged behind the screening device, and through the slightly ascending perforated screen bottoms of the screening device a stream of air is provided which fluidizes the material, the intensity of the stream of air being so adapted to a swinging movement of the screen that the lighter particles of textile fiber are caused to move in a direction opposite that of a heavier rubber granulate.

1 Claim, 3 Drawing Figures

APPARATUS FOR TREATING OLD TIRES

FIELD OF THE INVENTION

The present invention relates to a process and the corresponding apparatus for the working up of old tires, i.e. the recovery of rubber therefrom.

BACKGROUND OF THE INVENTION

Various processes are already known for working up old tires or their parts. In one previously used method, the old tires are broken up mechanically in such a manner that their original volume is reduced by about 70% so as to be able to deposit the broken up old tires on dumps in a manner compatible with the environment. Whole tires cannot be included in dumps, since the available stability of the garbage piles is greatly impaired thereby and the storage volume, which as a rule is scarce, is mainly taken up by the bulk and the large hollows of the tires. This method of eliminating old tires, to be sure, solves the problem of destruction in a manner compatible with the environment, but sacrifices connection the possibility of reuse of the old rubber which in itself is still valuable as a raw material.

Treatment plants for old tires which produce reusable ground rubber have been operating up to now in the following manner: the beads are first removed from the old tires by means of a hand-operated machine which requires corresponding skill on the part of the operator. The debeaded tires are thereupon cut into pieces and then ground in different grinding stages. For the pre-breaking stage, crushing machines of various constructions are successfully used. For the fine-grinding on the other hand gear-disk mills are used practically exclusively because of their ability mechanically to break primarily the association between rubber and textile fibers. Such a ground or disintegrated intermediate product can be separated on screening machines into two or more fractions. For the coarsest screen cloth there is selected a mesh size such that approximately pure textile fibers are removed as overflow. In the finer fractions there is obtained a mixture of granulated rubber and textile portions of the same order of magnitude. Attempts to separate these textile portions by wind sifters from the rubber core were unsuccessful, particularly because of the lack of economy of such a plant. Furthermore, the method described above is restricted to the treatment of tires with textile carcasses.

Customers for pure granulated rubber have up to now been restricted to the working of so-called "rough grind" which is obtained in tire regrinding plants upon the milling of the old tires.

OBJECT OF THE INVENTION

It is an object of the present invention to overcome the above-described disadvantages and limitations of the known treatment processes.

SUMMARY OF THE INVENTION

This object has been achieved in accordance with the present invention in that whole old tires — with textile or steel carcasses — are fed via a charging device to a pre-comminuting unit and there broken into pieces of the size of approximately the palm of a hand; these pieces are charged via a conveyor into a magnetic separator in order to remove all iron-containing portions, whereupon the iron-free pieces are finely ground in two grinding stages and at the same time the association between rubber and fiber components is broken; and finally the ground product is fed — preferably by a pneumatic conveyor to a multi-stage device for separating the rubber components from the fiber components. By the use of this process it has become possible to treat car tires which have become unusable, so-called old tires, in at least approximately automatically operating plants to a high percentage of 70 to 80% into a metal-free and textile-free rubber granulate of any desired particle size. The rubber granulates produced in this manner find use, for instance, as starting material for reclaimed rubber with its known advantages for use in the rubber industry, as rubber meal which can be incorporated directly into given rubber batches, as granulates of various particle sizes with a mixture of suitable additions and binders for the manufacture of resilient floor coverings or sound-insulating elements by compression, etc. All of these and similar uses require a granulate which is free of textile fiber, although in certain thermal reclaiming processes, portions of residual textile can be carbonized in situ. The apparatus in which the separating device for the finely ground rubber material and fibercontaining material consists of at least one mechanically operating screening machine which separates the ground material into at least three fractions based on particle size or shape and at least one sorting machine which seaprates it in accordance with specific gravity. By such a subdivision of the separating arrangement into at least one screening machine operating mechanically on basis of particle size or shape for the separating of the ground material into at least three fractions and at least one sorting machine separating them in accordance with specific gravity, there is obtained a particularly good separation of the entire ground material into textile components and pure rubber granulate with relatively low total expense for the machine investment and cost of operating energy.

There has been found particularly favorable a separating device in which the mechanically operating screening machine consists of a known positively controlled vibrating screen machine operating with relatively low frequency (for instance an Allgaier wobble screening machine) having two or three screening decks and as a sorting machine, one or more vibrating machines with slightly ascending perforated conveyor bottom through which an upward stream of air fluidizes the material. The air intensity is so adapted to the oscillation of the screen bottom that the lighter textile fiber particles are caused to move in opposite direction to the movement of the heavier rubber granulate. By the cooperation of the two types of screening and sorting machines which are already known for other purposes, there can be obtained a surprisingly clean separation of the ground tires into pure rubber granulate of any desired particle size and into textile components to be discarded, with a minimum expenditure of energy, which makes possible a treatment of old tires of all types both highly compatible with the environment and financially reasonable.

The expenditure for apparatus necessary in the case of the present invention is reduced to a fraction of that of the prior art, e.g. as represented by U.S. Pat. No. 2,471,043, namely a reduction to about 1/4 in the investment expenses alone. In addition to this, in the case of the apparatus of the invention, as a result of the use of predominantly mechanically operating machines, both for the screening and for the sorting rather than the separating devices of generally pneumatic operation employed in the previously known apparatus of the U.S. patent, there is also a very substantial saving in energy for carrying out the treatment.

In the extensive studies carried out by the applicant is has been found that it was not possible in practice economically to separate the textile portions by wind sifters from the rubber particles with satisfactory results It is another object of the present invention to use for the economical separation of rubber granulate and textile components, vibrating sorting machines with an ascending perforated conveyor bottom traversed by a fluidizing stream of air, already known for other purposes; other vibrating sorting machines were found to be entirely unsuitable for the purpose of the invention.

BRIEF DESCRIPTION OF THE DRAWINGS

These and other objects will become more readily apparent from the following detailed description of the present invention, in connection with the accompanying drawing, in which.

SPECIFIC DESCRIPTION

Figure 1:
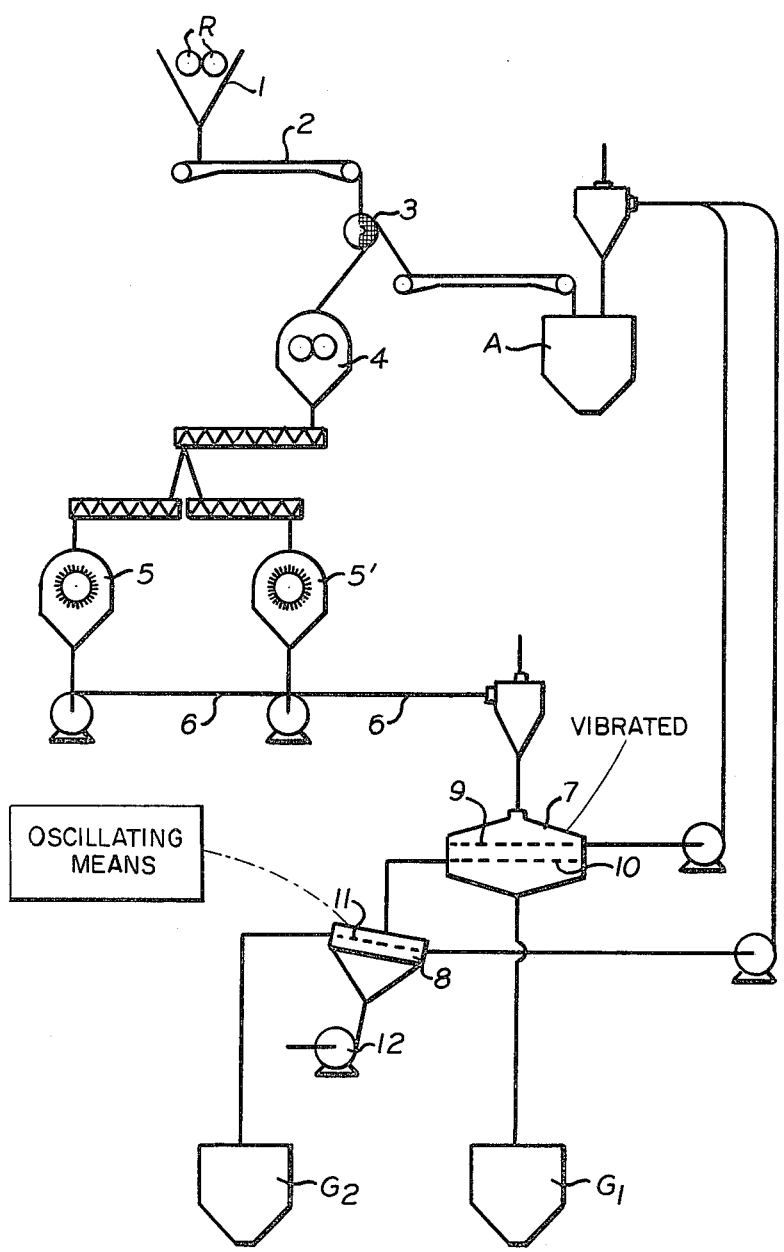
FIG. 1 shows schematically a plant used for the carrying out of the method of treating old tires in accordance with the invention.
Figure 2:
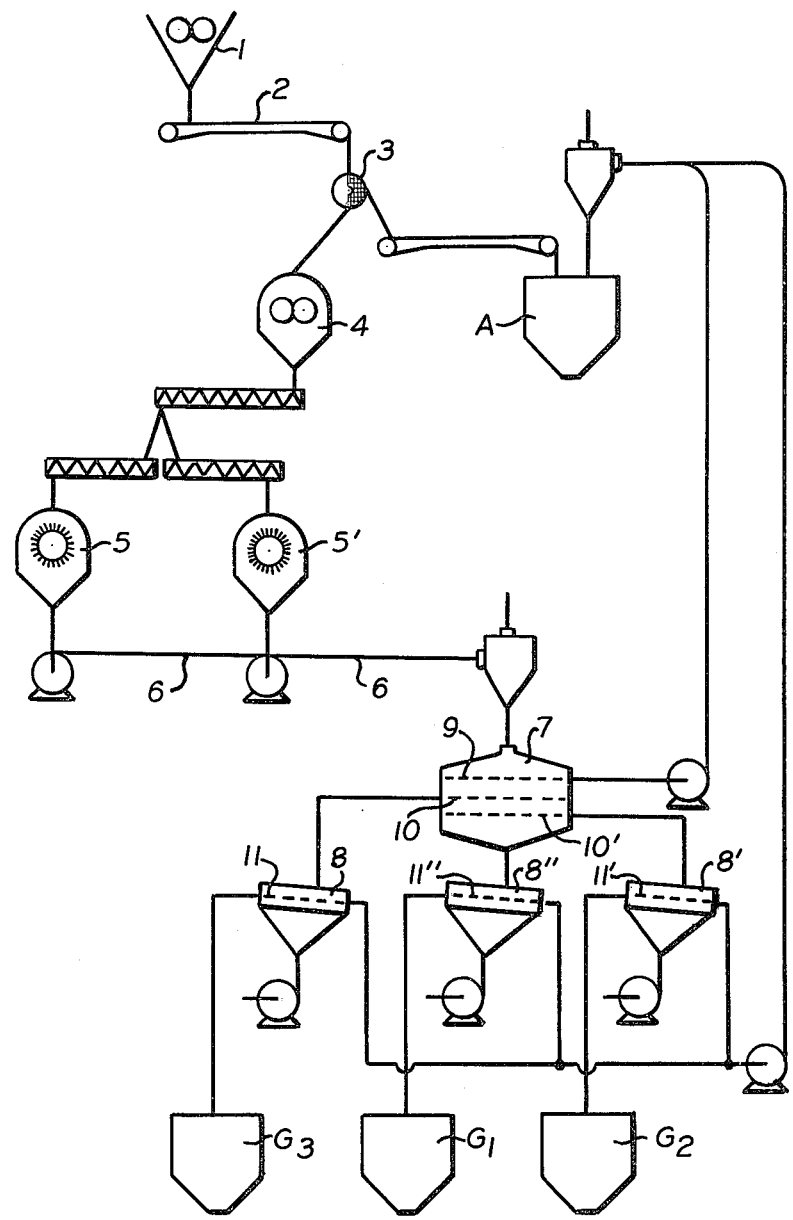
FIG. 2 shows a plant similar to that of FIG. 1, but with modified separating device.
Figure 3:
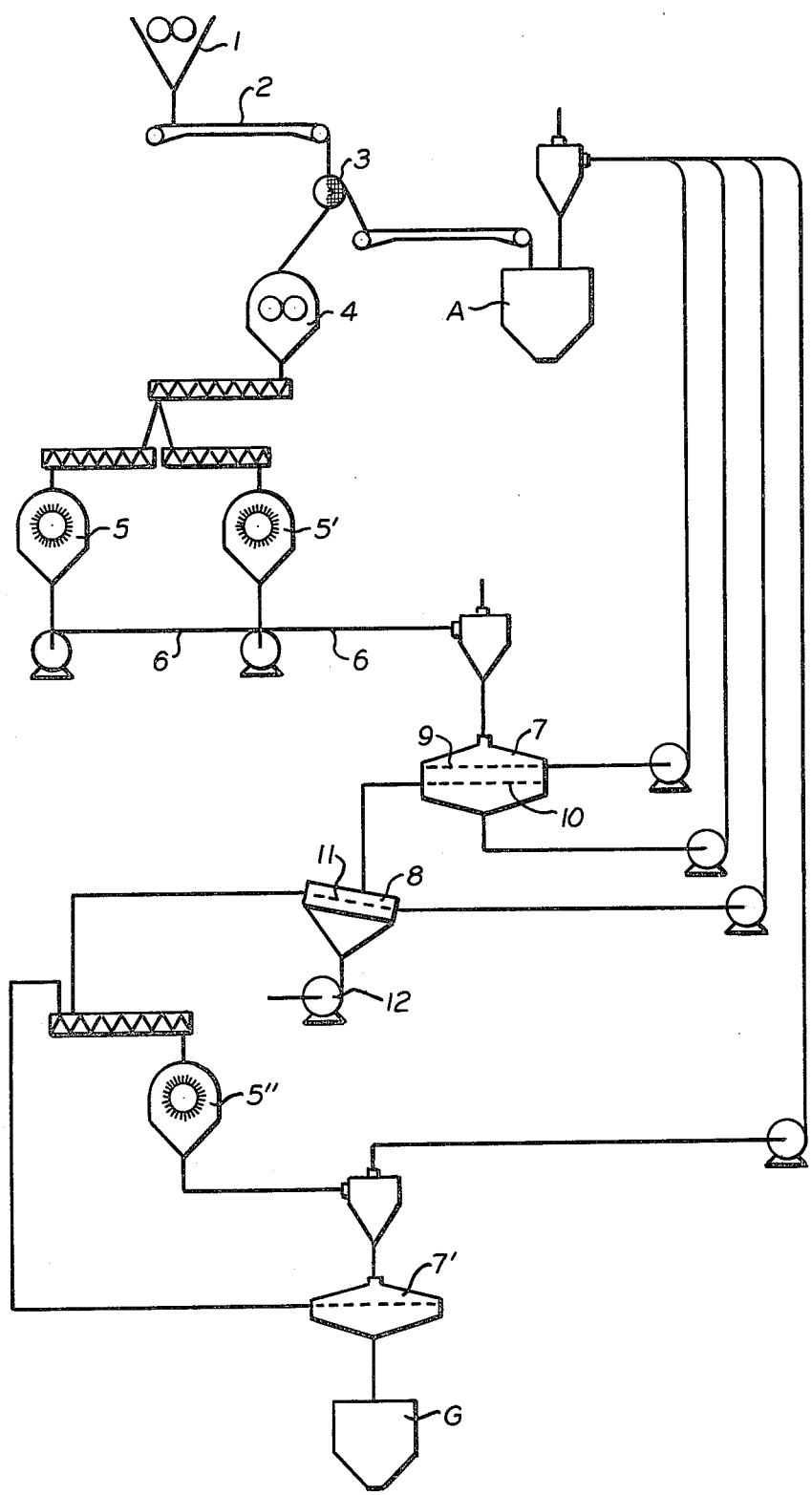
FIG. 3 shows another plant similar to that shown in FIG. 1, but with a differently modified separating device.

The plants for the carrying out of the method of treating old tires in accordance with the invention which are shown schematically in FIGS. 1 to 3 each comprise a pre-comminuting unit 1 to which the entire old tires R of any type are fed, preferably by a charging device of any desired type, not shown in the drawing, and in which they are divided into pieces of the size of the palm of the hand. By means of a conveyor belt 2, the pieces of old tires pass through a magnetic separator 3 which preferably includes a single-step or double-step drum magnet and operates with such a magnetic field strength that all iron-containing parts of the tire are removed therein. The portion of iron-containing pieces of tire sorted by the magnetic separator 3 is known from experience to be about 20 to 30% of the total quantity and is placed in intermediate storage as waste in a collector container A. This separated portion can either be deposited in a manner compatible with the environment on a dump or else be treated further in a separate treatment process, for instance a thermal treatment process. The steel-free parts of the roughly comminuted old tires are charged into a pre-breaker 4 constituted preferably as a rolling mill and advanced in further comminuted condition into for instance, two toothed disk (pin or attrition) mills 5,5' operating in parallel for the fine grinding. Via a preferably pneumatic conveyor system 6, the finely ground mixture of rubber granulate and textile fibers is fed to the multi stage separating device. In the case of the plant shown in FIG. 1, this comprises a mechanically operating low-frequency round screen machine 7 with two screen inserts 9 and 10, as well as a sorting machine 8 developed as vibrating machine with slightly ascending perforated bottom 11, supplied with an upward directed stream of air produced by a blower 12. On the upper screen deck 9 of the screening machine 7, practically pure textile fibers are separated out as overflow and fed, for instance, pneumatically, to the waste collector A. The practically pure particles of rubber passing through the lower screen deck 10 which is of considerably narrower mesh are collected in the fine-material collector G1. The overflow of the screen deck 10 which consists of a mixture of practically equal sized rubber and textile components is finally fed into the sorting machine 8 where it is separated into the rubber granulate of higher specific gravity which is fed via the vibrating perforated bottom 11 in ascending direction into the collector G2 and the downward conveyed light textile components fluidized by the stream of air which passes upward through the perforated bottom 11. The textile components are preferably fed again pneumatically to the waste collector A.

The plant shown in FIG. 2 for the carrying out of the process of the invention differs from the embodiment described above with reference to FIG. 1 only by a slightly modified version of the separating device. In this case, the mechanically operating screening machine 7 is provided not only with the coarse screen deck 9 for the separating of the longer textile fibers, but also with two different fine screens 10, 10' for the separating of the finer mixture of rubber granulate and textile components into three different fractions from which the textile components are separated via three parallel operating sorting machines 8, 8', 8'' having vibrating perforated bottoms 11, 11', 11'' in the same manner as already described in the case of the embodiment of FIG. 1 and fed to the waste collector A, while the different fine rubber granulates are collected in the material containers G1, G2, G3.

The embodiment of FIG. 3 differs from the embodiment of FIG. 1 finally essentially by the fact that the separating device which consists again of a screening machine 7 with two screen decks 9 and 10 and a sorting machine 8 with ascending perforated bottom 11 and blower 12 has, arranged behind it, another grinding circuit with a toothed grinding mill 5'' containing special fine grinding wheels and another screening machine 7' so as to produce a particularly fine rubber meal which is collected in the material container G.

I claim:

1. An apparatus for treating old rubber tires having carcasses of fiber material and steel, comprising:
   a first comminuting device for breaking up said tires into pieces;
   magnetic separator means for removing from the pieces produced by said device, those pieces containing steel;
   a first mill for comminuting the pieces passing said magnetic separator means and producing a coarse product;
   an attrition mill connected to said first mill for comminuting said coarse product and producing a fine product and releasing said fibers from the rubber; and
   means for separating said fine product into a first component consisting predominantly of said fibers and a second component substantially free from fibers and constituting a rubber granulate, said separating means including:

at least one horizontal vibrating-sieve screening device having at least two horizontal sieve decks lying one above another, means for removing above the upper one of said decks at least part of said first component, means for removing a rubber granulate from below the upper one of said decks, and a sorting device receiving the rubber granulate removed from below the upper deck, said sorting device having a perforated surface inclined slightly to the horizontal and adapted to receive the rubber granulate removed from below said upper deck, means for oscillating said perforated surface, and means for passing a fluidizing gas stream upwardly through said perforated surface at a intensity related to the oscillation of said surface and sufficient to cause rubber particles to ascend on said surface and fiber particles to move in the opposite direction to said rubber particles.

* * * * *